Feb. 23, 1965 R. W. S. KINSEY 3,170,992

SELECTIVE ELECTRICAL MARKING ARRANGEMENTS

Filed May 17, 1961

2 Sheets-Sheet 1

Feb. 23, 1965 R. W. S. KINSEY 3,170,992

SELECTIVE ELECTRICAL MARKING ARRANGEMENTS

Filed May 17, 1961

2 Sheets-Sheet 2

United States Patent Office 3,170,992
Patented Feb. 23, 1965

3,170,992

SELECTIVE ELECTRICAL MARKING ARRANGEMENTS

Ronald William Stanley Kinsey, deceased, late of London, England, by Kathleen Kinsey, Letchworth, and Joyce Marguerite Eva Childs, Eltham, London, England, administratrices, assignors to Associated Electrical Industries Limited, London, England, a British company

Filed May 17, 1961, Ser. No. 112,168
5 Claims. (Cl. 179—18)

This invention relates to selective electrical marking arrangements by which a number of individual connections, for example subscribers' lines in an automatic telecommunication switching system, can be selected and marked for service by or access to some common equipment capable of serving only one of the connections at a time. Some such selection is required where two or more of the connections may simultaneously require the services of the common equipment, as for instance in an automatic telecommunication system in which two or more subscribers' lines may be simultaneously calling, but can only be dealt with one at a time.

Where the total member of connections is large, it is convenient for the sake of economy to group the connections on a co-ordinate basis and to effect the selection on a group basis: that is, the total number of connections is divided into, say X groups with Y connections in each group and the selection is effected by selecting a particular one of the X groups and one of the Y connections in the selected group. Thus instead of having to select directly one out of, say, a hundred connections, the hundred connections can be grouped into ten groups of ten and the selection can be achieved by two one-out-of-ten selections, one selection being of a particular group and the other of a particular connection within that group.

Where a connection is selected on a group basis, its identity is presented for selection in a coded form: for instance in the general example mentioned above the identity of a connection is coded as group X/number Y simply XY. In order to mark a connection selected on this basis, it is necessary to de-code the selection to give an individual marking: that is, the X and Y ordinates of the selected connection have to be combined so as to identify and mark the selected connection on an individual basis. The coding and de-coding can be effected by means of so-called gating circuits (hereinafter simply called gates) and usually each connection has required to have separate, unidirectional, gates for the two functions, thereby requiring a total number of gates equivalent to twice the number of connections. Consequently, the number of components required to constitute these gates, even if they are of the simple diode/resistor form commonly employed in electronic circuits, tends to be very high. It is possible to design somewhat complex diode/resistor gates which are bi-functional in that they can serve for both coding and de-coding, but it is found that, while the use of such gates might lead to a small saving in the total number of gate components required (as compared with those required for separate coding and de-coding gates), this saving is more than offset by accompanying disadvantages such as the rather high input and output impedances of the bi-functional gates, the difficulty in designing the gates to function correctly for all possible values of the components within their manufacturing tolerances, and the fact that the gates tend to consume relatively large amounts of power, especially when multiplied a hundred-fold or, as would be the case in application to a large (10,000 line) telephone exchange, ten thousand-fold.

According to the present invention in one aspect thereof a selective marking arrangement serving a plurality of co-ordinately grouped connections and employing a selective marker which functions on a group basis, all as aforesaid, comprises in respect of each said connection, for coding its identity for selection by the marker and decoding its selection when made by the marker, a bi-functional gate comprising an input/output path including switching means operable to establish current flow through this path, and a number of encoding and decoding branch paths which lead to the selective marker and of which one branch path includes a transistor which, with said switching means in operated position, passes encoding current of characteristic amplitude or direction through that branch path but is switchable from the marker to pass decording current differing in respect of such characteristic from the encoding current, the input-output path of the gate having associated with it discriminating means operable in response only to decording current flow in the transistor for marking the appertaining connection as having been selected. For the sake of simplicity in providing for the necessary discrimination between encoding and decoding current flow in the transistor it is preferred to arrange for reversal of direction rather than for change of amplitude.

More particularly, each bi-functional gate may comprise an input/output path, a first branch path leading to a first, group, selector in the selective marker in common with the corresponding first branch paths of the gates pertaining to other connections in the same group (X), said first branch paths including respective de-coupling impedances, a second branch path leading to a second, ordinate-in-group, selector in the selective marker in common with the corresponding second branch paths of the gates pertaining to other connections having the same ordinate (Y) in their respective groups, said first and second selectors each functioning in response to current flow in any of the branch paths leading to it, switching means in the input/output path operable to establish current flow through this path and the first branch path, a transistor included in the second branch path and switchable into conduction by the first selector of the marker (for instance by application of an appropriate base potential) in the operated condition of said switching means, and further switching means operable by the second selector to reverse the direction of current flow in the transistor thereby to mark the particular connection by operation of a device responsive to this reverse direction of current flow. The switching means may be electro-mechanical, for example relays, but preferably would be of electronic or some other static form. The transistor in each gate, by reason of the requirement for it to be able to conduct in opposite directions, would preferably be of a symmetrical kind, but it is possible to use an asymmetrical transistor operating alternately in forward and inverse mode as required.

Figure 1:
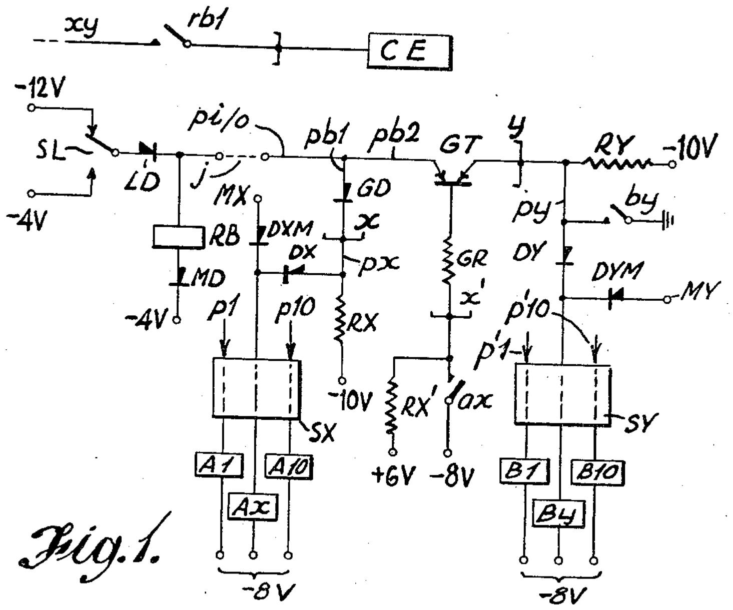
FIG. 1 illustrates a basic bi-functional gate and somewhat schematically shows its mode of use in accordance with the invention.
Figure 2:
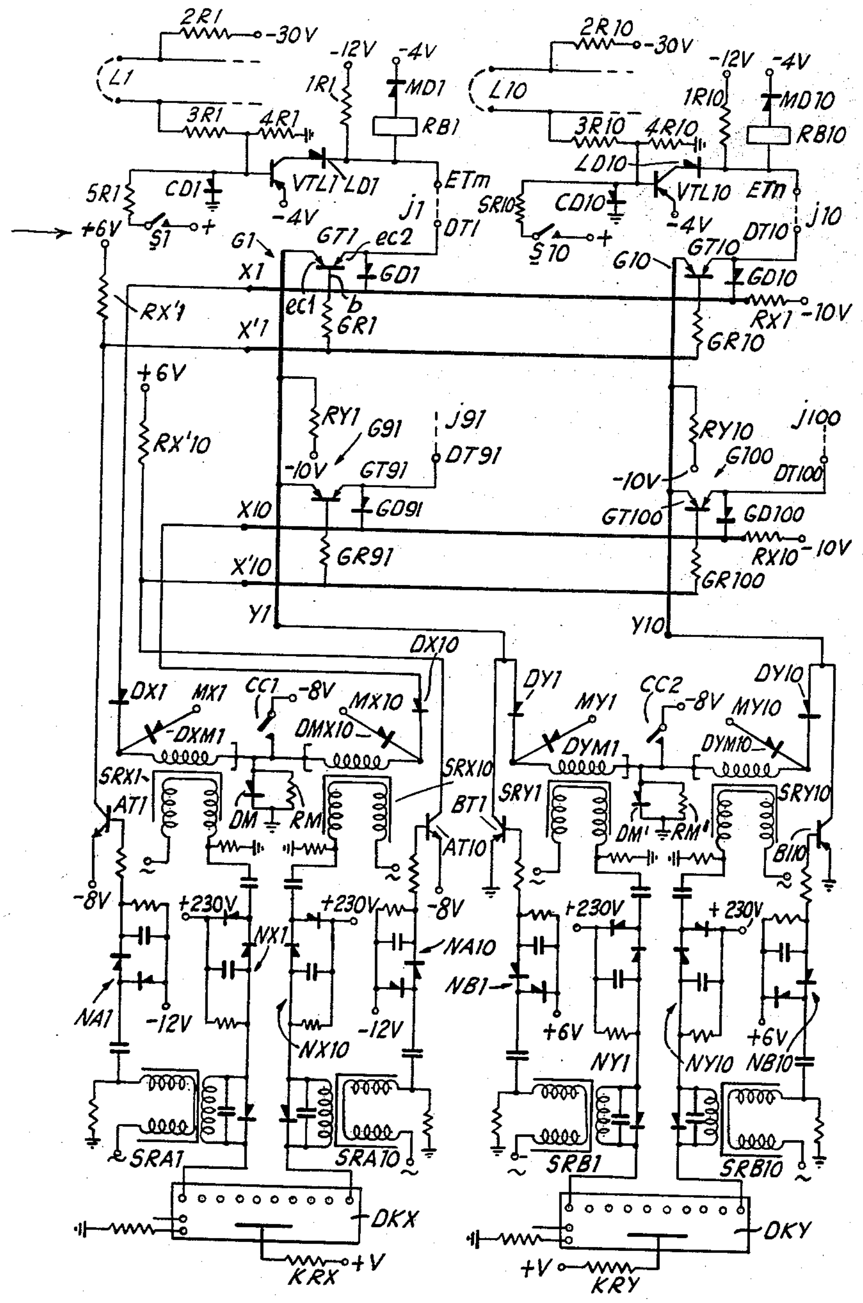
FIG. 2 illustrates an adaptation of the invention for use in an automatic telephone exchange with particular application to exchanges employing cross-bar switches or electronic cross-point switching matrices.

Considering the general case of a number of connections, typified by *xy* at the top of FIG. 1, which are to be selectively marked for attention by some common equipment CE, let it be assumed that selection is to be effected on a group basis and that there are a hundred connections effectively divided into ten groups of ten connections each. Referring to FIG. 1, there is provided for each such connection a bi-functional gate which, as typically shown for one of these connections ($xy$), comprises an input/output current path $pi/o$, a branch path $pb1$ including a de-coupling rectifier (diode) GD, and another branch path $pb2$ including a symmetrical transistor GT. The branch path $pb1$ is commoned (at $x$) with the corresponding branch paths of the gates associated with the other connections in the same group ($x$), and these commoned paths extend as path $px$, over a rectifier DX whose function will be indicated later, to a selector SX to which also extend the corresponding commoned paths $p1$ . . . $p10$ from the gates of the other connection groups. Likewise the branch path $pb2$ is commoned (at $y$) with the corresponding branch paths from the gates associated with the other connections having the same number or position ($y$) in their respective groups: these commoned paths extend as path $py$ over rectifier DY to a selector SY to which also extend the corresponding commoned paths $p'1$ . . . $p'10$ for the gates of those connections of different number in their groups. The transistor GT has an individual base resistor GR which is commoned (at $x'$) to a marking circuit for the $x$ group including switch $ax$ which is operable by the selector SX. This switch $ax$ is controlled by a switching device A$x$ which pertains to group $x$, there being one such device A1 . . . A10 for each of the ten groups. These devices have been represented as relays in FIG. 1, but could be electronic or other static switching devices as will appear when FIG. 2 is subsequently considered. In like manner the selector SY controls switching devices B1 . . . B10 of which the device B$y$ controls switch $by$ in a marking circuit for path $py$.

Figure 3:
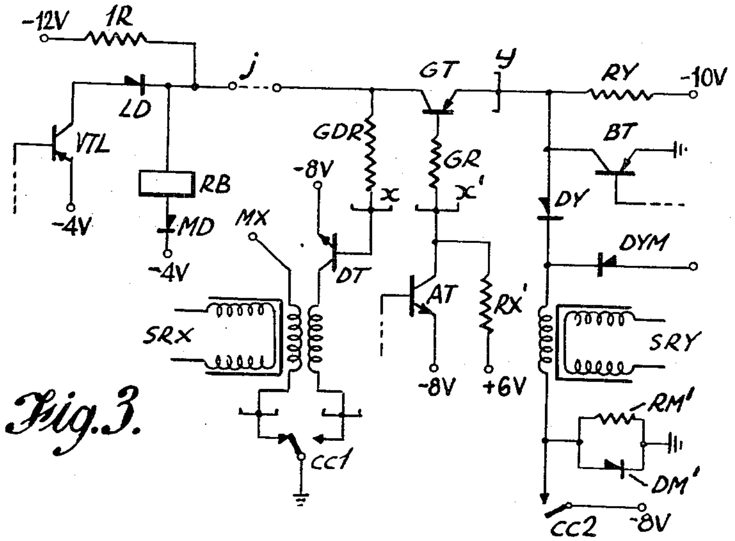
FIG. 3 illustrates a possible modification of the basic bi-functional gate.

In FIG. 1, and again in FIG. 2 and FIG. 3, certain terminals have been marked with potential values which, while being in fact practical values having regard to the operating characteristics of the transistors and other components, are also to be considered as showing typical operational relationships between the potentials of the several terminals rather than as being limiting absolute values.

The operation is basically as follows: When the connection $xy$ calls for the services of the common equipment CE an electronic or other switch SL is operated which changes the potential on path $pi/o$ from −12 v. existing in the quiescent condition to −4 v. in the calling condition. As a result, current flows through rectifier LD, path $pi/o$, rectifier GD in path $pb1$ and resistance RX (common to the $x$ group) to the −10 v. terminal. As a result of this current flow, current also flows through rectifier DX and path $px$ to the selector SX. This selector operates to select one of the groups for which current is flowing in the appertaining commoned path $p1$ . . . $p10$, it being appreciated that connections in more than one group, and more than one connection in any group, may be simultaneously calling. According to the selection made by the selector SX, the switching device A1 . . . A10 for the selected group is operated. Assuming group $x$ is selected, switching device A$x$ is operated and operates switch $ax$ to mark the selected group, doing so by replacing by a −8 v. potential a +6 v. potential which in the quiescent condition is applied by resistor RX' to the commoned base resistors such as GR of the transistors GT pertaining to the $x$ group. This +6 v. potential initially holds these transistors nonconductive, but on replacing it by the −8 v. potential a base current is drawn in those transistors of the marked group which have a −4 v. calling potential applied to them over path $pi/o$. Consequently emitter-collector current flows in these transistors by way of path $pi/o$, path $pb2$ and resistor RY to −10 v. connected to this latter resistor. Resistor RY is common to those transistors which pertain to connections having the same number ($y$) in the several groups. As a result of this current flow, current flows over path $py$ and rectifier DY to selector SY which thereupon effectively selects a particular connection number ($y$) and operates the corresponding switching device B1 . . . B10. Assuming that device B$y$ is operated, switch $by$ applies earth potential to the path $py$ and as a result the current flowing in the collector-emitter circuit of transistor GT is reversed. This is because the applied earth potential is more positive than the −4 v. potential on the path $pi/o$, whereas beforehand the −4 v. potential was more positive than the −10 v. potential applied through resistor RY. The reversal of current flow occurs only in one transistor, and the current now flows to −4 v. potential via winding of relay RB and rectifier MD rather than by way of switch SL and diode LD, because the latter is now backed off. The consequent energization of relay RB marks the connection $xy$ as that which has been selected for attention by the common equipment, doing so for instance by closing a contact $rb1$ which couples the connection $xy$ to the common equipment. The application of earth to the transistor GT by operation of switch $by$ not only reverses the collector-emitter current in this transistor but also increases the base current through resistor GR and the current through rectifier GD, since the potential difference across these components is now effectively that between earth and −8 v. or −10 v. respectively rather than between −4 v. and −8 v. or −10 v. as previously. This maintains the reverse conducting transistor in this condition until such time as the switch $by$ is released, and ensures that no other selection can be effected until then, even although other connections may be calling. The switch $by$ can be released by the common equipment in any convenient manner after the selected connection has been attended to, whereafter another calling connection can be dealt with.

Before going on to describe FIG. 2, consideration will be given to certain requirements that have to be made when the connections previously referred to are constituted for example by respective subscribers' lines connected to a telephone exchange. For maximum flexibility in an exchange the equipment position number in the exchange of the line circuit equipment individually associated with a subscriber's line should be divorced from the directory number of the line: that is to say, the sequence of equipment position numbers should be independent of the sequence of the directory numbers. This enables each line to be terminated at any line circuit but always to be called by dialling the line's directory number. This requires the provision of appropriate translation facilities by which to relate a dialled directory number to the appropriate exchange position number. If a called line is to be individually marked and the called line's identity is received on a digital basis as is usual, then suitable decoding is also necessary in respect of called lines.

In the case of calling lines, it is only required that a particular calling line be selected and marked, and if this is done on an exchange position basis no translation is required as for called lines. However in applying the present invention for selection and marking of calling lines, a selected calling line is marked on an individual basis by way of the bi-functional gate associated with the calling line, the selection being decoded from the group basis on which it was made. If, therefore, the decoding part of the marking arrangement for a calling line, including the bi-functional gate, is arranged to function on a directory number basis with translation to exchange position number, then evidently this decoding part could also be used for the marking of called lines. Consequently only one set of decoding gates would then be required for calling and called line marking, with resultant economy. Furthermore since the lines are individually marked over the input/output paths of the relevant bi-functional gates, these paths could evidently include respective translation strappings each requiring only a single wire and extending between a "directory number" terminal to which the gate is connected on one side of the strapping field and an "equipment position number" terminal to which the line circuit equipment including the discriminating marking device (relay RB in FIG. 1) is connected on the other side of the field.

Thus it is another aspect of the present invention that where a selective marking arrangement having bifunctional gates as hereinbefore set forth is employed for the selection and marking of calling subscribers' lines or other calling lines connected to a telecommunication switching centre (exchange), the input/output paths of the gates individually pertaining to the several lines include respective translation strappings in a cross-connection field affording translation between directory number and equipment position number, and called line marking means operable according to the identity of a called line is provided for stimulating at least the marking portion of the selective marker, and preferably also the selection portion, in like manner as for calling lines, whereby to mark the called line over the cross-connection field by way of the bifunctional gate associated with that line.

Thus referring again to FIG. 1, a called line corresponding to connection *xy* can be marked by applying to terminals MX and MY, which relate respectively to the group and the position in this group of the called line, a condition which causes current to flow through respective rectifiers DXM and DYM to the selectors SX and SY. Since only one line is being called at a time, the selectors must select the group and position-in-group of that line (doing so by operating switches *ax* and *by*) with the result that in the same manner as for a calling line the transistor GT is caused to conduct current in the decoding direction and relay RB responds to this current to mark the wanted line. In FIG. 1 the input/output path *pi/o* of the gate is shown as including a translation strapping *j*.

Coming now to FIG. 2 it will be assumed for the purposes of the description that the invention is applied for selective marking of 100 subscribers' lines connected to a cross-bar or electronic cross-point switching frame of a telephone exchange. The arrangement may however be easily expanded for a greater number of lines, for example 10,000. In applying the invention the (100) lines, typified by lines L1 and L10, are associated with respective bifunctional gates G1 . . . G100 arranged matrix-wise in ten horizontal groups of ten gates each. Only the first and last gates in the first and last groups are shown, the others being arranged similarly. Each gate comprises a symmetrical transistor GT1 . . . GT100, a base resistor GR1 . . . GR100 for the transistor, and a de-coupling rectifier (diode) GD1 . . . GD100, these components corresponding in each instance to the similarly lettered components in FIG. 1. The grouping of the gates is on a directory number basis and the input/output paths of the several gates include translation strappings *j*1 . . . *j*100 between directory number terminals DT1 . . . DT100 on the one hand and equipment position number terminals ET1 . . . ET100 (of which ET*m* and ET*n* are typical) connected to the line circuit on the other hand. This permits any line to be associated with any gate, thereby affording the desirable flexibility already discussed.

Each line circuit, taking line L1 as example, includes a marking relay such as RB1 and a p-n-p switching transistor such as VTL1 which is normally non-conductive so that a −12 v. potential is applied to the input/output path of the relevant gate (G1) over a collector resistor such as 1R1 for the transistor VTL1. When the subscriber on line L1 calls by looping his line in the usual manner a resistor chain such as 2R1, 3R1, 4R1, completed via the line loop, applies to the base of the transistor VTL1 a potential of at least about −5 v. which, being more negative than the −4 v. emitter potential of the transistor VTL1, renders this transistor conductive between its emitter and collector. As a result, the −12 v. potential on the gate input/output lead is changed to about −4 v., thereby indicating the calling condition. The action corresponds to that of switch SL in FIG. 1.

The line circuit for line L10 will be recognised as being the same as for line L1 and the line circuits for the other lines (not shown) are also the same.

The emitter-collector electrodes *ec*1 and *ec*2 of each symmetrical transistor GT1 . . . GT100 in the gate matrix are each able to serve either function according to the direction of conduction between them. In the gate matrix the GD rectifiers in the gates of each of the ten horizontal groups are connected in common to an X-ordinate lead X1 . . . X10 corresponding to the common path *px* in FIG. 1. Associated with each of these X-ordinate leads are respective X-ordinate marking leads X'1 . . . X'10 to each of which the transistor base resistors GR in the gates of the relevant horizontal group are commoned as at *x'* in FIG. 1. The electrode *ec*2 of the transistor in each gate is connected to the relevant DT terminal and corresponding transistors from the several groups have their electrodes *ec*1 commoned to vertical Y-ordinate leads Y1 . . . Y10 corresponding to path *py* in FIG. 1. Each X-ordinate lead X1 . . . X10 is connected through an individual resistor RX1 . . . RX10 to −10 v., each X-ordinate marking lead X'1 . . . X'10 is connected through an individual resistor RX'1 . . . RX'10 to +6 v., and each Y-ordinate lead Y1 . . . Y10 is connected through an individual resistor RY1 . . . RY10 to −10 v., all in accordance with FIG. 1.

Considering the operation in respect of line L1 by way of typical example, the −12 v. potential applied in the quiescent condition to the gate G1 via resistor 1R1 in the line circuit causes the gate rectifier GD1 to be reverse biased by 2 v. (−12 v. to −10 v. via RX1) and also causes reverse biasing by 18 v. (−12 v. to +6 v.) of the junction between the electrode *ec*2 and base *b* in transistor GT1, which is therefore well biased into non-conduction. The junction between electrode *ec*1 and base *b* in transistor GT1 is reverse biased by 16 v. (−10 v. to +6 v. via GR1 and RX'1).

When the subscriber on line L1 calls and the line circuit transistor VTL1 is rendered conductive, the input potential to the gate G1 changes from −12 v. to −4 v. as already mentioned. The gate diode GD1 is now forward biased (−4 v. to −10 v.), and the potential on the X-ordinate lead X1 changes from its quiescent value of −10 v. via resistor RX1 to a "calling" value of about −5 v., allowing for the voltage drop of the line circuit rectifier LD1 and the gate rectifier GD1. The *ec*2/*b* junction of transistor GT1 is still reverse biased however (−4 v. to +6 v.) and this transistor therefore remains non-conductive.

Assuming that, as already considered, the gate matrix is to be used not only for marking of calling lines but also for marking of called lines, it has to be ensured that the matrix can only be used for one of these functions at a time. This is achieved in the arrangement of FIG. 2 by means of preferably electronic switches *cc*1 and *cc*2. These switches may normally be in a condition permitting use of the matrix for called line marking, this being the condition shown, and operated to permit its use for calling line marking when a calling condition is detected on a line, or preferably they may be recurrently operated and released to render the matrix available for calling line marking and called line marking alternately. This latter arrangement will be assumed.

The X-ordinate leads X1 . . . X10 are connected via rectifiers DX1 . . . DX10 to one side of the D.C. control windings of respective saturable reactors SRX1 . . . SRX10. The other side of the control windings of these ten saturable reactors are commoned to earth via resistor RM and rectifier DM in parallel. Under this condition, with switch *cc*1 unoperated, the DX1 . . . DX10 diodes are reverse biased whether the X-ordinate leads to which they are connected are at the quiescent −10 v. potential or are at the calling −5 v. potential. Consequently no current can flow in the control windings of the saturable reactors SRX1 . . . SRX10. Thus even although one or more lines may be calling and the relevant X-ordinate or ordinates marked with −5 v. potential, no further action takes place until switch *cc*1 operates. On operation of switch *cc*1 a −8 v. potential is applied to the control windings of the saturable reactors SRX1 . . . SRX10 and reverse biases the common rectifier DM while forward biasing those of the rectifiers DX1 . . . DX10 which are connected to X-ordinate leads having the −5 v. calling potential. Current therefore flows in the control windings of the saturable reactors connected to these X-ordinate leads.

As lines in more than one group may be calling and current may therefore be flowing in the control windings of more than one of the saturable reactors SRX1 . . . SRX10, the next step is to select and mark one of the calling groups. This can be done by "one-only" selection or by scanning and in the present arrangement "one-only" selection by means of a multi-cathode gas tube DKX (dekatron) connected in a "lock-out" circuit has been assumed by way of example.

When current flows in the control winding of any one of the saturable reactors SRX1 . . . SRX10 the output from the A.C. winding of that saturable reactor is fed into a voltage doubling and rectifying network NX1 . . . NX10 which produces a negative-going output such that the potential of the relevant cathode of the dekatron DKX is reduced from +230 v. (which is too high for an anode-cathode discharge to take place) to about, say, +90 v. An anode-cathode discharge takes place to one and only one of the dekatron cathodes that may be brought to the +90 v. potential; discharge to any other such cathode is prevented by reason of the reduction in anode potential due to the discharge current flowing through the anode resistor KRX. The dekatron DKX therefore in effect selects one of the calling groups X1 . . . X10 according to the particular cathode to which the discharge takes place. The discharge current traverses the D.C. control winding of the relevant one of ten further saturable reactors SRA1 . . . SRA10. Let it be assumed that group X1 including calling line L1 has been selected so that current flows in the control winding of saturable reactor SRA1. The output from the A.C. winding of saturable reactor SRA1 is fed into a voltage doubling and rectifying circuit NA1 which at the base of an n-p-n transistor AT1 produces a positive-going potential which changes the base potential of this transistor from approximately −12 v. (at which potential the transistor is cut-off because of a −8 v. potential on its emitter) to about −2 v. which causes the transistor to conduct. As a result the +6 v. potential applied to the X-ordinate marking lead X′1 via resistor RX′1 is replaced by a potential of about −8 v. and all those gate transistors, including gate transistor GT1, which have their bases connected to this X-ordinate marking lead and which have the −5 v. calling potential applied to their electrodes *ec*2 due to a calling condition of the lines to which they pertain, are caused to conduct current in the direction from the *ec*2 terminal to the *ec*1 terminal. The action corresponds to that already described with regard to switch *ax* in FIG. 1.

As a result of the now conductive state of transistor GT1 the potential on the Y-ordinate lead Y1 changes from the −10 v. applied via resistor RY1 to the calling −5 v. potential. A similar change of potential takes place on any of the other Y-ordinate leads Y2 . . . Y10 as a result of the conduction of the GT transistor pertaining to any other calling line in the selected (X1) group.

The Y-ordinate leads Y1 . . . Y10 are connected through rectifiers DY1 . . . DY10 to one side of the D.C. control windings of respective saturable reactors SRY1 . . . SRY10. The other sides of these control windings are commoned to earth through rectifier DM′ and resistance RM′ in parallel. With switch *cc*2 unoperated this earth potential backs off the rectifiers DY1 . . . DY10 whether the Y-ordinate leads to which they are connected are at the −10 v. quiescent potential or are at the −5 v. calling potential. Operation of switch *cc*2 applies a −8 v. potential which reverse biases the rectifier DM′ and forward biases those of the rectifiers DY1 . . . DY10 which are connected to Y-ordinate leads having the calling −5 v. potential. Current flow therefore takes place in the control windings of those of the saturable reactors SRY1 . . . SRY 10 which are connected to these particular Y-ordinate leads. The A.C. outputs from the saturable reactors having current flowing in their control windings are fed to negative-going voltage doubling and rectifying networks NY1 . . . NY10 and thence to the relevant cathodes of a further dekatron tube DKY which effects a "one-only" selection in the same manner as already described for dekatron DKX. Let it be assumed that the Y1 ordinate is selected. The dekatron discharge current traverses the control winding of a saturable reactor SRB1 and the resulting output from the A.C. winding of this saturable reactor feeds a voltage doubling and rectifying circuit NB1 which provides a negative-going output by which the base potential of a p-n-p transistor BT1 is changed from a quiescent potential of about ×6 v., which was holding this transistor BT1 non-conductive, to a potential of about −4 v. which causes transistor BT1 to conduct. As a result of conduction of the transistor BT1, the potential of the Y-ordinate lead Y1 is brought to about earth potential, being the potential applied to the emitter of BT1. Since the previous selecting action by dekatron DKX has resulted in the base potential of transistor GT1 being brought to about −8 v., and since the potential at electrode *ec*2 of this transistor is at the calling −5 v. potential, the earth potential appearing at electrode *ec*1 from Y-ordinate lead Y1 results in a reversal of the emitter-collector current in the transistor GT1: that is, the current now flows in the direction from *ec*1 to *ec*2. The other transistors such as GT91 connected to the marked Y-ordinate lead Y1 remain non-conductive because the potential of their bases is held at the +6 v. potential applied to the X-ordinate leads in the non-selected groups.

As a result of the reversal of current in the transistor GT1 (which is the only one in which this reversal takes place) the potential on the input/output path of the gate G1, that is the path from the line circuit of line L1 via translation strapping *j*1, is changed to approximately earth potential. This reverse biases the line circuit rectifier LD1 and forward biases the rectifier MD1 in series with the marking relay RB1, so that this relay becomes operated to mark the line L1 as the calling line which has been selected.

Following operation of relay RB1, and in consequence of it, appropriate switching actions take place in respect of line L1 in the cross-bar or cross-point switching frame to which it is connected. These switching actions form no part of the present invention and therefore no detailed description of the actions or of the circuitry for effecting them need be given here. When these switching actions have been completed, a positive voltage fed via resistor 5R1 and clamped to about +½ v. by rectifier CD1 can be applied to the base of transistor VTL1 so as to cut it off and thereby remove the −5 v. calling potential. For the purpose of applying this last-mentioned positive voltage a switch S1 has been indicated in the drawing but the manner in which the positive voltage is applied will in general depend on the nature of the switching action which takes place in the switching frame. The removal of the −5 v. calling potential from the transistor GT1 does not however render it non-conductive because of the "locking" action that takes place in the gate G1 as already explained with reference to FIG. 1. Relay RB1 therefore remains operated and is only released when the marking and selecting circuits are released, and the conduction of transistor GT1 therefore stopped, on release of switches *cc*1 and *cc*2. Since the −5 v. calling potential from the line circuit of line L1 has now been removed, the gate matrix reverts to normal. The locking action referred to ensures that only one calling line can be selected and marked during the operated period of switches *cc*1 and *cc*2.

In order to mark a called line it would be sufficient to arrange for a separate marker (not shown) to be supplied with information as to the called line's identity, for instance by a register, and for it to apply directly to the relevant X' and Y leads, in accordance with the group and position-in-group of the called line, marking potentials similar to those by which these leads are marked for a selected calling line, that is, in the case of the X' ordinate marking leads the potential thereon would be changed to −8 v. from a quiescent +6 v. potential and in the case of the Y leads the potential would be changed to near earth potential from a quiescent −10 v. potential. However, as has already been mentioned it is preferred to use not only the marking portion of the arrangement for marking a called line but also the selecting portion, the reason for this preference being as follows:

If the selection process fails in respect of calling lines, there is no simple method of indicating the location of the failure because of the possibility that several lines may be calling simultaneously. When a called line is to be marked however (assuming that it is an ordinary, non-P.B.X, line) only one line is involved. Since the marking requirements in the gate matrix are identical for calling and called conditions the separate marker already referred to may be arranged to act as if it were a single calling line: that is, instead of marking the X' and Y ordinate leads directly it would be arranged to mark the input side of the selecting portion of the circuit at terminals MX1 . . . MX10, MY1 . . . MY10 in such manner as to cause current flow in the control windings of those particular saturable reactors (one from SRX1 . . . SRX10 and one from SRY1 . . . SRY10) which correspond to the group and position-in-group of the wanted line. For this purpose, and remembering that for the marking of a called line the switches *cc*1 and *cc*2 are unoperated, the potential of the terminals MX1 . . . MX10, MY1 . . . MY10 would be held at, say −10 v. potential in the quiescent condition and changed to +6 v. in the marking condition. With the −10 v. potential effective, rectifiers DXM1 . . . DXM10, DYM1 . . . DYM10 included in series between the terminals MX1 . . . MX10, MY1 . . . MY10 and the respective control windings of the saturable reactors SRX1 . . . SRX10, SRY1 . . . SRY10 are backed off to earth if switches *cc*1 and *cc*2 are not operated and to −8 v. if *cc*1 and *cc*2 are operated. With +6 v. at one of the terminals MX1 . . . MX10 and one of the terminals MY1 . . . MY10, and with switches *cc*1 and *cc*2 unoperated, the relevant DXM and DYM rectifiers become forward biased and current flows through the control winding of the associated SRX and SRY saturable reactors. The dekatrons DKX and DKY then function to "select" and mark the called line in the same manner as for a calling line. In this case of course, as there is only one called line, the selector dekatrons can only select this line. If the circuits are functioning correctly, the X' ordinate marking lead and Y ordinate lead which are marked from the selector dekatrons in order to mark the called line through the relevant gates in the gate matrix, are those which could have been marked directly by the marker as already mentioned. Provision can therefore easily be made to check that the circuits are functioning correctly and it may indeed be arranged for the marker to go through a complete marker routine in non-busy periods in order to check the circuits, this being possible provided that during such action the resulting operation of the RB relays is rendered ineffectual.

Provision for the marking of the MX and MY terminals may be made in any convenient manner, for instance by having them connected to the collectors of respective marking transistors which have a −10 v. potential connected to their collectors through respective resistors and +6 v. potential connected to their emitters, these transistors being normally non-conductive and the marking of any particular MX and MY terminal being achieved by rendering conductive the two marking transistors which are relevant. Since a hundred lines could be identified by two decimal digits the two sets of marking transistors could be controlled directly in accordance with the value of these digits.

The ten-by-ten matrix of gates G1 . . . G100 can serve a hundred lines as assumed above. For a greater number of lines the size of the matrix can be appropriately increased. For instance 10,000 lines could be served by a matrix of a hundred groups of gates with a hundred gates in each group. In this latter case the two one-out-of-ten selectors constituted by the dekatrons DKX and DKY would have to be replaced by two circuits each affording one-out-of-a-hundred selection: such selection could be achieved in two stages using two one-out-of-ten selectors (dekatrons) appropriately inter-related. With this ten-thousand line, hundred-by-hundred matrix, there would be a hundred MX and a hundred MY called line marking terminals. Assuming that in this instance the called lines are identified by four decimal digits the values of which are presented to the marker, for example by a register, as markings which according to the digit values are applied to one lead out of each of four sets of ten such leads, then for the purpose of marking the appropriate MX and MY terminals these markings may be combined in pairs into appropriate markings on one lead out of each of two sets of a hundred leads extending to the marking terminals. This combination may be achieved in each instance by arranging that the two original markings of a pair render conductive two serially connected transistors replacing the single marking transistor already suggested above. The +6 v. marking potential would then be obtained only when both of these transistors are conductive together: otherwise the −10 v. quiescent potential would prevail.

As has already been indicated, it is possible for the bi-functional gates to employ ordinary, asymmetrical transistors rather than symmetrical transistors, in which the transistors would be required to function in inverse mode, that is with current flow in the direction from collector to emitter, in respect either of calling, encoding, current or of marking, de-coding, current. Since the gain of an asymmetrical transistor is less in inverse mode than in normal mode, and since greater power is required for operating the line marking relays (RB) than for energizing the control windings of the saturable reactors, it is preferable in using asymmetrical transistors in the bi-functional gates to connect the collectors of the transistors to the input/output paths of the gates.

This use of an asymmetrical transistor is shown for a typical one of the gates in FIG. 3, which also illustrates the possibility of replacing the gates' de-coupling rectifier (GD, FIGS. 1 and 2) by a de-coupling resistor GDR. In FIGS. 1 and 2, the de-coupling afforded *by the or each gate* rectifier GD is necessary because the path through this recifier leads to a common resistive circuit from which feedback to the other gates connected to this common circuit could otherwise take place. A rectifier tends to be more expensive than a resistor and is more liable to failure. If, in FIG. 2, one of the GD rectifiers fails by going short-circuit, it tends to affect the whole of the common (X) group of gates and therefore the lines to which these gates relate. A resistor can be used instead of a rectifier, with consequent advantage as regards expense and reliability, provided that the ratio between its resistance and that of the common circuit is sufficiently great to permit the required degree of attenuation (de-coupling) while at the same time permitting sufficient "forward" current to flow to activate the common circuit. This requirement can be satisfied, as illustrated in FIG. 3, by including a transistor DT in the common circuit: the base-emitter circuit of this transistor (which is of the n-p-n variety to meet the other requirements of the overall circuit) presents a low resistance to the de-coupling resistances such as GDR of the commoned gates and the collector-emitter circuit of the transistor provides the necessary current (when the transistor is rendered conductive) to energize the control winding of the saturable reactor SRX associated with the relevant X group. In this case, in view of the requirement that the resistance of the common circuit must remain low at all times it is not possible to switch the emitter potential between −8 v. and earth by the *cc*1 switch by which the conditions for calling line marking and called line marking are selectively and alternatively established. It is therefore necessary to make provision for a different mode of called line marking in respect of the X-ordinates and one way of doing this is by providing on the saturable reactor SRX an additional control winding connected to the called line marking terminal MX as shown, and by arranging the switch *cc*1 to complete the energizing circuit of one or other of the two control windings. The remaining components in FIG. 3 correspond to those similarly lettered in FIG. 2.

What is claimed is:

1. A selective marking arrangement comprising a selective marker for the individual selection and marking on a group basis of a plurality of coordinately grouped connections; a bi-functional gate provided in respect of each said connection for coding its identity for selection by the marker and decoding its selection when made by the marker, said gate comprising an input-output path including switching means operable to establish current flow through its path, encoding-decoding branch paths connecting said input-output path to the marker, and a transistor connected in one of said branch paths for passing encoding current of characteristic amplitude or direction through that branch path and the input-output path in an operated condition of said switching means; and further switching means operable by the selective marker according to a selection made thereby for causing said transistor to instead pass decoding current differing from the encoding current in respect of such characteristic, the input-output path of the gate having associated with it discriminating means operable in response only to decoding current flow in the transistor for marking the appertaining connection as having been selected.

2. The selective marking arrangement as defined in claim 1 wherein the selective marker comprises a first selector for group selection and a second selector for ordinate-in-group selection, the bi-functional gates pertaining to connections in the same group have respective first branch paths which include respective decoupling impedances and lead in common to said first selector, the bi-functional gates pertaining to connections having the same ordinate in their respective groups have respective second branch paths leading in common to said second selector and including the transistors of the respective gates, said first and second selectors each functioning to make a selection in response to current flow in any branch path leading to it, the switching means in the input-output path of each gate is connected to establish current flow through this path and the first branch path of the gate when operated, the first selector has means operable thereby for switching into conduction the transistors of these gates which pertain to connections of a selected group for which the switching means in the input-output paths have been operated, and said further switching means is operable by the second selector to reverse the direction of current in the conductive transistor of the gate pertaining to a selected connection, the discriminating means comprising a device operable in response to this reverse current to mark the particular connection as having been selected.

3. The selective marking arrangement as defined in claim 2 including a resistance as decoupling impedance in the first branch path of each bi-functional gate and a further transistor having a base connection and an emitter-collector circuit, the first branch paths of the bi-functional gates relating to connections in the same group extending in common to said base connection and the first selector being responsive to current flow in said emitter-collector circuit.

4. The selective marking arrangement as defined in claim 2 for the selection and marking of calling lines for attention in a telecommunication switching center, said bi-functional gates being provided individually in respect of the several lines and including in their input-output paths respective translation strappings for affording translation between directory number and equipment position number, the selective marker having a marking portion and a selection portion and the arrangement including called line marking means operable according to the identity of a called line for stimulating at least the marking portion of the marker in like manner as for calling lines, whereby to mark the called line by way of the bi-functional gate and translation strapping associated with that line.

5. The selective marking arrangement as defined in claim 4 having called line marking means operable to stimulate both the marking portion and the selection portion of the selective marker.

References Cited in the file of this patent

UNITED STATES PATENTS

| | | |
|---|---|---|
| 2,735,893 | Gourrierec | Feb. 21, 1956 |
| 2,760,004 | Reenstra | Aug. 21, 1956 |